US012482583B2

(12) United States Patent
Keil et al.

(10) Patent No.: US 12,482,583 B2
(45) Date of Patent: Nov. 25, 2025

(54) TWISTING DEVICE AND METHOD FOR DETERMINING OR CHECKING A LAY LENGTH OF A LINE BUNDLE, COMPUTER-IMPLEMENTED METHOD, AND COMPUTER PROGRAM PRODUCT AND UPGRADE KIT THEREFOR

(71) Applicant: SCHLEUNIGER AG, Thun (CH)

(72) Inventors: Uwe Keil, Hückeswagen (DE); Witali Janzen, Wuppertal (DE); Roland Kampmann, Witten (DE); Andreas Zahle, Radevormwald (DE)

(73) Assignee: SCHLEUNIGER AG, Thun (CH)

( * ) Notice: Subject to any disclaimer, the term of this patent is extended or adjusted under 35 U.S.C. 154(b) by 957 days.

(21) Appl. No.: 17/050,015

(22) PCT Filed: Apr. 25, 2018

(86) PCT No.: PCT/IB2018/052868
§ 371 (c)(1),
(2) Date: Oct. 23, 2020

(87) PCT Pub. No.: WO2019/207344
PCT Pub. Date: Oct. 31, 2019

(65) Prior Publication Data
US 2021/0118594 A1 Apr. 22, 2021

(51) Int. Cl.
H01B 13/02 (2006.01)
D07B 7/02 (2006.01)

(52) U.S. Cl.
CPC ......... *H01B 13/0207* (2013.01); *D07B 7/022* (2013.01); *H01B 13/0221* (2013.01);
(Continued)

(58) Field of Classification Search
CPC . B21F 7/00; B21F 15/04; D07B 7/022; D07B 2301/251; D07B 2301/581;
(Continued)

(56) References Cited

U.S. PATENT DOCUMENTS 2,209,584 A * 7/1940 Somerville ............ D07B 7/022
33/711
2,909,393 A * 10/1959 Berry .................. G01N 27/9093
166/241.1
(Continued)

FOREIGN PATENT DOCUMENTS

EP 1 113 539 A2 7/2001
JP 2007-242431 A 9/2007
(Continued)

OTHER PUBLICATIONS

WO 2011105629A1, Yokoyama Feb. 2011.*
(Continued)

Primary Examiner — Edward T Tolan
(74) Attorney, Agent, or Firm — Finch & Maloney PLLC

(57) ABSTRACT

A twisting device (10) for twisting or stranding electrical or optical lines (12) to form a line bundle (13). The twisting device (10) comprises at least one first twisting head (15) and a clamping device (25). The first twisting head (15) and the clamping device (25) are spaced apart from each other. The twisting device (10) has at least one detecting device (30) for capturing information indicative of a lay length of the line bundle (13). The at least one detecting device (30) can be moved relative to the first twisting head (15) and the clamping device (25).

14 Claims, 4 Drawing Sheets

Figure 1:
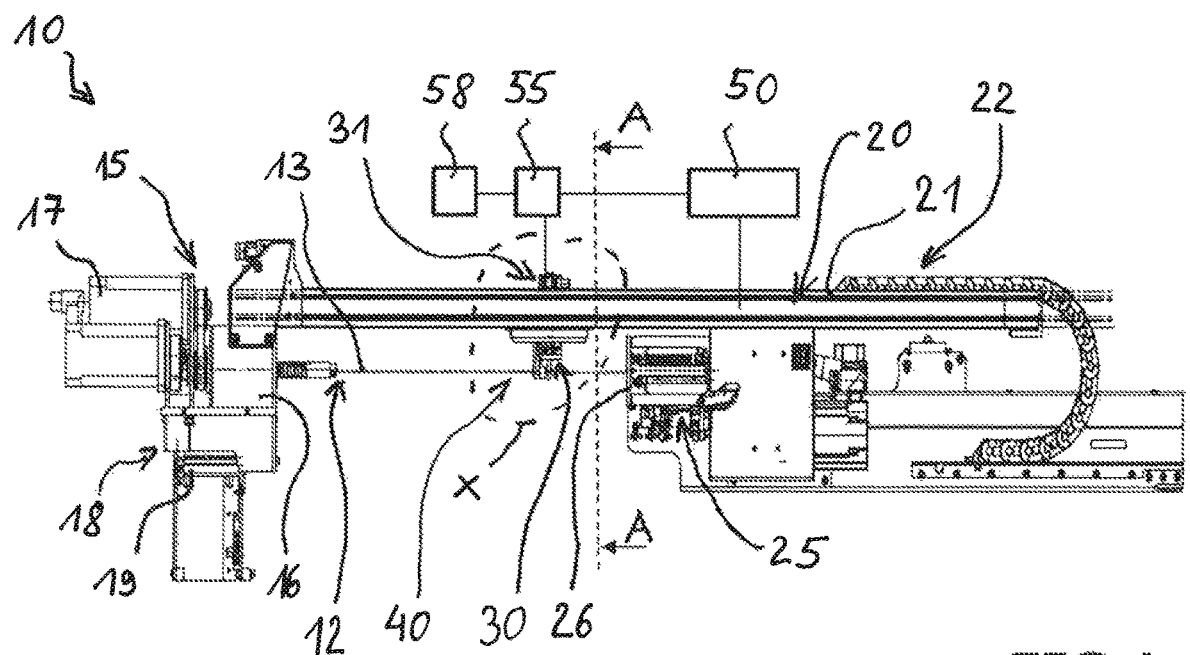

(52) U.S. Cl.
CPC ............... *D07B 2301/251* (2013.01); *D07B 2301/5581* (2013.01); *D07B 2301/5586* (2013.01)

(58) Field of Classification Search
CPC ...... D07B 2301/5509; D07B 2501/406; H01B 13/0207; H01B 13/0221; G01N 27/9093
See application file for complete search history.

(56) References Cited

U.S. PATENT DOCUMENTS

| | | | | |
|---|---|---|---|---|
| 3,277,420 | A * | 10/1966 | Council | G01N 27/9093 439/296 |
| 3,299,349 | A * | 1/1967 | Tompkins | G01N 27/9093 324/262 |
| 3,743,928 | A * | 7/1973 | Forster | G01N 27/82 324/235 |
| 3,872,378 | A * | 3/1975 | Shiraiwa | G01N 27/9093 73/601 |
| 4,218,651 | A * | 8/1980 | Ivy | G01N 27/82 324/151 R |
| 4,507,610 | A * | 3/1985 | Nakaoka | G01N 27/9006 324/237 |
| 4,827,215 | A * | 5/1989 | van der Walt | G01N 27/82 324/242 |
| 6,189,359 | B1 * | 2/2001 | Caporusso | B21D 11/14 72/299 |
| 6,272,387 | B1 | 8/2001 | Yoon | |
| 6,728,453 | B2 * | 4/2004 | Petryszak | D07B 7/022 385/104 |
| 8,718,352 | B2 * | 5/2014 | Winter | G01N 21/952 382/152 |
| 9,075,023 | B2 * | 7/2015 | Yoshioka | G01N 27/83 |
| 9,416,488 | B2 * | 8/2016 | Stier | H01B 13/0235 |
| 9,470,657 | B2 * | 10/2016 | Ouellette | G01R 33/04 |
| 10,222,351 | B2 * | 3/2019 | Kondoh | G01N 27/82 |
| 10,984,925 | B2 * | 4/2021 | Shirai | H01B 13/0271 |
| 2004/0050446 | A1 * | 3/2004 | Ichikawa | B21F 7/00 140/149 |
| 2019/0214166 | A1 | 7/2019 | Shirai et al. | |

FOREIGN PATENT DOCUMENTS

| | | |
|---|---|---|
| JP | 2018-054478 A | 4/2018 |
| WO | 2016/158282 A1 | 10/2016 |
| WO | 2017/159604 A1 | 9/2017 |

OTHER PUBLICATIONS

DE102016015717A1, Herzig et al. Nov. 2017.*
International Search Report Corresponding to PCT/IB2018/052868 mailed Jan. 3, 2019.
Written Opinion Corresponding to PCT/IB2018/052868 mailed Jan. 3, 2019.

* cited by examiner

TWISTING DEVICE AND METHOD FOR DETERMINING OR CHECKING A LAY LENGTH OF A LINE BUNDLE, COMPUTER-IMPLEMENTED METHOD, AND COMPUTER PROGRAM PRODUCT AND UPGRADE KIT THEREFOR

The invention relates to a twisting device for twisting or stranding electrical or optical lines to form a line bundle, a method for determining or checking a lay length of a twisted or stranded line bundle, a computer-implemented method for automatic determination and generation of datasets, a computer program product, a control device for controlling a twisting device, a use of a twisting device and an upgrade kit for a twisting device according to the preambles of the independent claims.

In the manufacture of twisted or stranded line bundles, the lay length represents an important quality feature, because the lay length of the twisted or stranded line bundle defines the shielding region from interfering fields of lines in close proximity. Twisted or stranded line bundles are typically used in automobile manufacture, because they can be integrated simply with machinery in the automated manufacturing processes that prevail in such environments. The line bundles are typically in manufactured in a twisting device in a twisting process or a stranding process. A twisting device described in the present document is designed for twisting or stranding at least two lines to form a line bundle, and the twisting device is able to carry out a twisting process or a stranding process. A line bundle consisting of only two lines is typically referred to as a twisted pair.

For the present purposes, a twisting process is understood to mean the reciprocal rotation of two or more lines around each other. In order to achieve a given twisting arrangement in this manufacturing process, in the simplest case the twisted line bundle must be overwound so that after a tension release process it settles into the desired final twisted arrangement.

For the present purposes, a stranding process is understood to mean that two or more lines are laid around each other by rotating about a common axis. In the stranding process, a capstan is moved along the lines to be stranded from one line end to the other line end as the lines to be stranded are wound around each other.

Consequently, a twisted or stranded line bundle develops multiple line bundle troughs and line bundle peaks in a plane along the longitudinal axis of the line bundle, which are spatially separated from each other.

For the present purposes, the lay length of a stranded or twisted line bundle is understood to refer to the regular distance between the beginning of a line bundle trough and the beginning of another line bundle trough, or the regular distance between the beginning of a line bundle peak and the beginning of another line bundle peak.

Alternatively, the lay length is defined by detecting/counting line bundle peaks and line bundle troughs over a defined segment of the line bundle and calculating the average lay length relative to this defined segment.

It is also known that newly twisted or stranded lines do not necessarily have exactly the same properties over their entire length. In particular, the properties may still change somewhat, particularly at the line ends, after the tension has been released or after they have been removed from the twisting device, for example because a distance between the ends of the lines is no longer fixed, and can now be changed.

In the known processes for manufacturing line bundles, a regular lay length depends for example on the line material, temperature, etc., and is subject to variations. Therefore, it must be checked regularly. The regularity of the lay length of stranded or twisted line bundles, i.e. the uniformity and tolerance fidelity of the individual lay lengths is a quality requirement in Automotive Directive LV 122, for example. It can happen during the manufacturing process that the manufacturing parameters initially selected for the twisting device are not suitable for producing a line bundle that satisfies every aspect of the quality requirements of the Automotive Directive LV 122, with the result that the manufacturing parameters of the twisting device have to be adapted incrementally and/or iteratively.

JP 2007-242431 A discloses a twisting device for producing a line bundle and a method for manufacturing a line bundle. The twisting device has an elongated base, each end of which is fitted with a twisting head. The lines to be twisted are clamped into the two twisting heads of the twisting device and twisted. A camera is arranged together with the twisting head on one of the base ends for determining the lay length of a twisted line bundle.

The disadvantage of this known solution is that the determination of the lay length of the twisted line bundle takes place at a point on one end. The final quality check of the lay length of the twisted line bundle must also be carried out on an external lay length quality inspection apparatus.

The object of the present invention is to remedy one or more disadvantages of the prior art. In particular, the intention is to create a twisting device and/or a method for determining or checking a lay length of a twisted or stranded line bundle on a twisting device, such that the line bundles produced reliably fulfil the stipulated quality requirements. Additionally, in particular a computer-implemented method, a computer program product and/or a control device for controlling a twisting device and/or an upgrade kit for a twisting device are to be provided which remedy one or more drawbacks of the related art.

This object is solved with the apparatuses, methods, devices and upgrade kits defined in the independent claims. Advantageous further developments are presented in the figures, the description, and in particular in the dependent patent claims.

The twisting device according to the invention for twisting or stranding electrical or optical lines to form a line bundle comprises at least one first twisting head and a clamping device. The first twisting head and the clamping device are spaced apart from each other. The twisting device comprises at least one detecting device for capturing information indicative of a lay length of the line bundle. The at least one detecting device is movable relative to the first twisting head and the clamping device.

With this, it is possible to capture information indicative of a lay length of the line bundle at any position on the twisted or stranded line bundle on the twisting device. This enables the lay length to be determined at a specific position along the line bundle, in particular at a certain distance from the twisting head. Thus, it is possible to capture information indicative of a lay length of the line bundle uninfluenced by the twisting head or a clamping apparatus mounted thereon, which holds the line bundle, that is to say uninfluenced by the construction of the twisting device. This has the effect of improving the quality of this indicative information. Moreover, the capture of the indicative information is made possible by the movability of the detecting device at multiple locations, which in turn means that a further check of the lay length of the twisted or stranded line bundle on an external lay length checking apparatus can be dispensed with.

The capture of the information indicative of a lay length of the line bundle is advantageously an image of the line bundle, so that a simple determination of lay length can be made by means of image recognition. For the present purposes, the image of the line bundle is understood to be an optically captured image of the line bundle. For example, an image is a two-dimensional or three-dimensional representation which is captured with the at least one detecting device.

The information indicative of a lay length of the line bundle may include spatially resolved and/or temporally resolved intensity measurements (patterns, colours, . . . ) which are, captured by the at least one detecting device.

Particularly in the case of a twisted pair, the indicative information may typically be an image of the line bundle which is illuminated from one side. Thus, in the simplest form the image is equivalent to the shadow cast by the line bundle, wherein this image has matching constrictions, which corresponding to the line bundle troughs. Thus, the information indicative of the lay length may be the distance between the first constriction and the second constriction, for example.

Preferably, the at least one detecting device is movable independently of the first twisting head and the clamping device, so that the information indicative of a lay length of the line bundle may be determined independently of a status of the twisting apparatus and/or independently of the twisting head at an unlimited number of positions between the first twisting head and the clamping device.

The twisting device is preferably equipped with a guide device, wherein the at least one detecting device is disposed on the guide device. By this means, the detecting device is precisely positionable anywhere along the twisted or stranded line bundle, or it may be positioned anywhere away from the twisted or stranded line bundle.

More preferably, the twisting device is equipped with at least one support device for supporting the lines and/or the line bundle. This suppresses or prevents oscillation of the lines while the line bundle is being produced, and thus enables the production of line bundles to be carried out extremely accurately.

Vibration of the line bundle can also be prevented or suppressed while the information indicative of the length of the line bundle is captured.

The at least one support device preferably includes a Support unit, thus enabling the lines and/or the line bundle to be supported very accurately and allowing a constant distance to be defined between the line bundle and the at least one detecting device.

The support unit is advantageously cylindrical in shape, so that the line bundle may be supported simply.

Additionally, the lines to be twisted or stranded may be arranged parallel to each other on the circumference of the cylindrical support unit.

Alternatively, the support unit is constructed in a T-shape. In this case, the leg of the T is arranged in such manner that the lines to be twisted or stranded are spaced apart from each other in the manufacturing process.

Alternatively, the support unit is constructed in a V-shape, which thereby ensured improved vibration damping of the line bundle, since the lines and/or the line bundle are arranged inside the V-shaped opening.

The at least one support device advantageously has a positioning unit for positioning the support unit, so that the distance between the line bundle and the at least one detecting device is adjustable. Consequently, any distance from the at least one detecting device may be set depending on the line types (cross-section, non-metallic sheathed cable) in the twisted or stranded line bundle. Additionally, the support unit together with the positioning unit can be moved towards and away from the line bundle, so that the line bundle rests on the support unit or is at a distance therefrom. The approach or distancing movement of the support unit is advantageously performed as a rotating motion, so that the movement can be completed within a particularly small space.

The at least one support device is preferably arranged on the guide device, so that the at least one support device is movable along the guide device.

The at least one support device is preferably movable relative to the first twisting head, thereby allowing the at least one support device to be movable along the line bundle and thus enabling the at least one support device to be positioned anywhere on the twisted or stranded line bundle.

In particular, the at least one support device is movable together with the at least one detecting device. As a result, the at least one support device and the at least one detecting device may be positioned simultaneously anywhere on the twisted or stranded line bundle. Thus, an item of information indicative of the lay length may be captured at a position on the twisted or stranded line bundle where the twisted or stranded line bundle is supported by the support device.

More preferably, the at least one detecting device comprises a camera for capturing the information indicative of the lay length. Accordingly, the indicative information for the capture of the lay length occupies at least two spatial dimensions. Typically, a camera comprises an imaging sensor, such as a CMOS sensor or a CCD sensor, for example, for capturing an image. And additional information about the lines and/or line bundle may also be captured from the image, such as their colour, insulation pattern, twist direction (Z or S twist), for example, or even damage to the line insulation.

Alternatively, the at least one detecting device comprises a laser sensor for capturing the information indicative of the lay length of the line bundle. Laser sensors are typically of simple, sturdy construction and are easy to maintain and adjust. A laser sensor, in particular a laser curtain, enables a rapid one-dimensional measuring method for capturing the information indicative of the lay length. In this process, the laser sensor measures for example a width of the line bundle and in so doing detects the line bundle peaks and line bundle troughs. At the same time, spatially resolved and/or temporally resolved intensity measurements (shadowing measurements) for example can be performed along the twisted or stranded line bundle and can be evaluated quickly, thus enabling a simple determination of the lay length on the line bundle.

It is also conceivable that the distance between the line bundle and that laser along a certain line bundle length may be measured with the aid of the laser sensor and in this way the line bundle peaks and line bundle troughs are identified. A corresponding spatially resolved measurement along the line bundle enables e.g. the distance between individual line bundle troughs to be determined thereby allowing a determination of the lay length.

The twisting device preferably has a lighting device. The lighting device is designed to illuminate the lines that are to be twisted or stranded while the information indicative of the lay length is captured, so that different properties, such as line dimensions, line colours etc. are detectable by the at least one detecting device.

The lighting device advantageously comprises a shielding unit. This serves to prevent incident of extraneous light, which prevents the capture of the information indicative of the lay length from being distorted.

For example, an improved imaging determination of the lay length can be performed when a camera is used, in particular, differently coloured lines in a line bundle can be detected easily in an image.

The lighting device is preferably arranged on the at least one detecting device, with the result that the quality of the capture with the detecting device is improved because the twisted or stranded line bundle can be illuminated uniformly at any position. The capture parameters are uniformly reproducible for each position.

In particular, the lighting device is an integral component of the camera, which ensures a compact, simple construction and the quality of the capture with the camera is improved further.

More preferably, the twisting device includes a control device for controlling or adjusting the twisting device. Among other things, the control device controls the movements of the first twisting head and the clamping device, so that it is possible to make the twisted or stranded line bundles in a manner that can be reproducible by the machine. This control device also advantageously controls and adjusts the detecting device, which is arranged movably on the guide device. In this way, both the twisting device and the at least one detecting device can be controlled or adjusted with one central control device, so that the capture of the information indicative of the lay length of the line bundle can be performed on the line bundle clamped in the twisting device. Thus, the movement sequences of the twisting device and the at least one detecting device can be controlled and adjusted in tandem with one another.

Alternatively or additionally, the detecting device is equipped with a control device with which the detecting device may be actuated separately and independently of the twisting device, and can be moved to any position on the twisted or stranded line bundle.

Alternatively or additionally, the twisting device may include an evaluator for evaluating the information indicative of the lay length of the line bundle. The at least one detecting device is connected to the evaluator for exchanging data. The evaluator receives the information indicative of the lay length of the line bundle from the detecting device. This enables the information indicative of the lay length of the line bundle to be evaluated directly at the twisting device.

For the present purposes, evaluation of the information indicative of the lay length of the line bundle in the evaluator comprises at least the receiving of the data, in particular the measurement data, from the detecting device, and at least a comparison of the received data with known reference data in the evaluator and at least an assignment of the compared data to a previously defined lay length of the line bundle.

For this purpose, the evaluator advantageously includes an arithmetic unit, which receives the data of the information indicative of the lay length of the line bundle and optionally may be able to process it further.

In particular, the evaluator is connected to the control device in order to exchange data. The data can be processed further in the evaluator and is usable in the control device for correcting the line bundle manufacturing process. Then, at least individual parameters for a twisting process or stranding process of the first twisting head can be adapted.

The evaluator is advantageously connected to the control device of the at least one detecting device for the purpose of exchanging data. In this way, for example, at least individual parameters for the capture of the information indicative of the lay length can be adapted at the at least one detecting device, and this data can be adapted independently of the twisting device.

The evaluator is preferably connected to at least one database for the purpose of supplying reference data. The database contains a data library of stored data for twisted or stranded line bundles with an extremely wide variety of properties (type, structure, dimension, etc.), called reference data, which comprise at least one item of expected indicative information as a reference value for the lay length. The database typically also includes reference data for the manufacturing process with reference to the lines to be processed. In this way, the measured indicative information for the lay length may be compared with the respective reference value of the indicative information provided for the lay length in the evaluator. A corresponding reference value is available in the data library of the database according to the properties of the twisted or stranded line bundle in the twisting device, with which the lay lengths of many different twisted or stranded line bundles can be determined.

The reference data are filed in the database and include data on the lay length of a line bundle with previously defined properties and/or reference values. These are generated in advance in twisting processes or stranding processes of an enormous variety of lines and line combinations for example, according to twisting parameters (e.g., the rotating speed of the first twisting head) or stranding parameters (e.g., the speed of movement of a stranding capstan along the longitudinal axis of the lines to be stranded) and stored in the database.

Or they may also be data which have been entered manually and with no comparison tests.

More preferably, a length compensation device is provided to compensate for the change in length of the lines in the twisting process or stranding process. This allows a uniform axial tensile force to be set for the clamped lines in the twisting process or stranding process.

The length compensation device is preferably equipped with a displaceable length compensating slider. The shortening of the lines to be twisted or stranded in the respective twisting or stranding process describes a parabolic function, the nature of which is dependent on the rotating speed, and is executed by the length compensating slider which is movable along the longitudinal axis of the line bundle. The twisting process is usually initiated with a low rotating speed of the twisting rotor until the lines to be twisted are lying flush against each other and the axial tensile force remains constant.

The length compensating slider is typically passively movable and is acted upon by a biasing element, for example a pneumatically controlled cylinder, with a force directed away from at least a first twisting head. The biasing element is advantageously connected to the control device of the twisting device. In this way, an axial tensile force is applied to lines that are to be twisted or stranded over the entire travel path of the elements that move during the twisting process or stranding process, in order to thus improve the twisting process or stranding process and the quality thereof. The data needed for this are advantageously transmittable from the control device to the evaluator so that they are available for use in the line bundle manufacturing process.

A further aspect of the invention relates to a method for determining or checking a lay length of a twisted or stranded line bundle on a twisting device, wherein the method comprises the following steps:

Making the line bundle available;
Positioning at least one detecting device for the line bundle,
Moving the at least one detecting device to any first position relative to the line bundle;
Capturing at least one item of information indicative of the lay length of the line bundle at the first position on the line bundle with the aid of the at least one detecting device.

The capture of the at least one item of information indicative of the lay length of the line bundle anywhere on the twisted or stranded line bundle on the twisting device enables an accelerated quality check of the lay length, with no interfering influences on the twisting head by the clamping apparatus or gripping devices for example. The movement of the at least one detecting device also allows the indicative information to be captured at one or more specific positions. Consequently, the use of an external lay length checking apparatus is no longer essential. This reduces the time required for the overall manufacturing process.

The method is advantageously carried out with the twisting device described earlier, which in turn enables the time required for the manufacturing process to be reduced further.

In particular, the at least one detecting device is positioned opposite the line bundle at a specified distance from the line bundle, whereby the quality of the capture of the information indicative of the lay length may be improved.

In particular, the at least one detecting device is moved to any first position along a longitudinal axis of the line bundle, whereby the capture of the information indicative of the lay length is made possible at any position, particularly if the distance between the at least one detecting device and the stranded or twisted line bundle remains unchanged.

In particular the information indicative of the lay length of the line bundle is an image of the line bundle. This enables actual imaging of the line bundle. This image can be inspected directly by a user of the twisting device.

The at least one item of information indicative of the lay length of the line bundle is preferably transmitted to an evaluator for evaluation of the lay length of the line bundle. This makes it possible for the information indicative of the lay length of the line bundle to be processed further.

The evaluator receives these data, which are converted to a standardised format for example, thereby enabling a rapid determination of the lay length of the line bundle.

More preferably, the at least one detecting device is moved to a further position relative to the line bundle and captures at least one item of information indicative of the lay length of the line bundle at the new position on the line bundle, and transmits it to the evaluator.

In this way, the lay length can be determined at another position on the line bundle, and any deviation from a previously desired lay length at any further position on the line bundle may be detected.

The at least one detecting device is preferably moved to another position relative to the line bundle. In so doing, the detecting device captures at least one item of information indicative of the lay length of the line bundle while travelling to this one further position and transmits the at least one item of information indicative of the lay length of the line bundle to the evaluator. In this way, it is possible for the lay length to be determined continuously over the entire travel path on the line bundle, and any deviation from a previously desired lay length at any further position on the line bundle may be detected.

The travel path between the first position and a further position is advantageously equal to fixedly defined distance value, thereby improving the quality of the evaluation of the information indicative of the lay length of the line bundle.

In particular, the defined distance value is one metre (1 m), which thereby ensures compliance with one of the quality requirements in Automotive Directive LV 122.

The evaluator preferably compares the at least one item of information indicative of the lay length of the line bundle from the first position with reference data and assigns a first lay length to the line bundle at the respective position. The reference data or reference values stored in the database are transmitted to the evaluator according to the properties of the twisted or stranded line bundle and compared with the at least one item of information indicative of the lay length of the line bundle, thereby enabling the performance of a rapid quality check of the lay length.

In the event of a deviation between the information indicative of the lay length of the line bundle taken from the first position of the line bundle and the reference data or reference value, the evaluator preferably creates correction data or at least one correction value which is transmitted to the control device of the twisting device and/or the control device of the detecting device. The correction data or at least one correction value comprise an adaptation to the twisting process or stranding process or an adaptation to the capture of the information indicative of the lay length of the line bundle. For example, the rotating speed of the first twisting head is changed and/or the speed of movement of the standing capstan is changed.

Alternatively or additionally, the evaluator compares the at least one item of information indicative of the lay length of the line bundle taken from the further position with reference data and assigns a further lay length to the line bundle at the respective position. In this way, the lay length may be measured at various positions, and for example a change or an average of the lay length along the longitudinal axis of the line bundle may be determined.

More preferably, the first assigned lay length is stored in at least one database. Thus, new reference data and reference values which match the first assigned lay length is saved in the database, thus serving to expand the database holding.

Alternatively or additionally, the further assigned lay length is stored in at least one database. Thus, new reference data and reference values which match the further assigned lay length is saved in the database, thus serving to expand the database holding and remaining available for retrieval by the evaluator at any time.

The twisting device is preferably equipped with at least one first twisting head and a clamping device for forming the line bundle. The at least one detecting device is movable relative to the first twisting head and the clamping device. In this way, the information indicative of a lay length of the line bundle can be determined at any position between the first twisting head and the clamping device.

The at least one detecting device is preferably moved relative to the first twisting head and the clamping device independently, so that the detecting device is movable to any position along the line bundle. This means that the information indicative of a lay length of the line bundle may be determined at any number of positions between the first twisting head and the clamping device independently of a status of the twisting device and/or independently of the twisting head.

More preferably, at least a section of the line bundle is supported by means of at least one support device before the at least one item of information indicative of the lay length of the line bundle is captured. This serves to damp an oscillating motion of the twisted or stranded line bundle.

In particular at least a section of the line bundle is supported by at least one support device in the region of the at least one detecting device before the at least one item of information indicative of the lay length of the line bundle is captured. In this way, a defined distance is fixed between the at least one detecting device and the twisted or stranded line bundle and/or persistent vibration of the line bundle is suppressed or prevented.

The at least one support device is preferably moved relative to the line bundle, so that the at least one support device can be placed at any position along the longitudinal axis of the line bundle.

In particular, the support unit of the at least one support device is moved towards the line bundle, thus enabling a defined distance to be set between the at least one detecting device and the line bundle.

The at least one support device preferably moves together with the at least one detecting device, so that the at least one support device and the at least one detecting device can be moved at the same time. Consequently, both the at least one support device and the at least one detecting device can be driven by a single driving arrangement.

In particular, the at least one support device and the at least one detecting device are moved while the lines are being twisted or stranded. This makes it possible for the lay length to be determined even during the twisting process or stranding process on the twisting device and/or for the twisting or stranding process to be checked and/or monitored substantially in real time.

A further aspect of the invention relates to a computer-implemented method for automated determination and generation of datasets based on at least one item of information indicative of the lay length of a line bundle, in particular according to a method and/or a computer-implemented method as described in this document for controlling a twisting device, in particular with a twisting device as described in this document, based on at least one item of information indicative of the lay length of a line bundle. The computer-implemented method comprises at least the following steps:

Capturing at least one item of information indicative of the lay length of a line bundle with at least one detecting device;
Comparing the at least one item of information indicative of the lay length of the line bundle with reference data;
Defining correction data of the basis of the comparison of the reference data with the at least one item of information indicative of the lay length of a line bundle;
Transmitting the correction data to a control device of the twisting device for the correction of a twisting process or stranding process at the twisting device.

The computer-implemented method thus enables an automatic adaptation in the twisting process or stranding process without the user having to adapt the programming of the control device for the twisting device. The datasets include for example movement commands, for example for a driving arrangement for the first twisting head, which are generated on the basis of the correction data. This also makes it possible for novel lines, for which no twisting process or stranding process is yet known, to be twisted or stranded to form a line bundle reproducibly.

In particular the capture of at least one item of information indicative of the lay length of a line bundle with at least one detecting device comprises an image of the line bundle, thereby enabling simple quality testing.

The movement commands generated are preferably transmitted to the control device where they are executed. This enable the twisting process or stranding process to be adapted automatically.

A further aspect of the invention relates to a computer program product comprising movement commands which, when executed on a computer or control device cause the device to carry out the steps of the computer-implemented method as described in this document on a twisting device, in particular on a twisting device as described in this document. Consequently, previously defined twisting processes or stranding processes which have been synchronised with the line bundle to be produced can be carried out on the twisting device.

A further aspect of the invention relates to a control device for controlling a twisting device, in particular a twisting device as described in this document, with a computer program product as described in this document, whereby after the computer program product has been loaded in the control device a line bundle with a previously defined lay length may be produced.

A further aspect of the invention relates to the use of a twisting device, particularly a twisting device as described in this document, to execute a method as described in this document for determining or checking a lay length of a line bundle.

A further aspect of the invention relates to an upgrade kit for a twisting device. The upgrade kit comprises at least one detecting device for capturing at least one item of information indicative of a lay length of a line bundle and a computer program product as described in this document. With this kit, an existing twisting device can be retrofitted with a device for determining the quality of the lay length, on which after installation of the upgrade kit previously defined line bundles can be produced in high quality.

In particular, the upgrade kit includes at least one detecting device for capturing an image of the line bundle. This enables imaging methods for determining the lay length of the line bundle to be carried out.

The upgrade kit preferably includes a guide device which may be mounted on the twisting device, the at least one detecting device being arranged movably on the guide device. With this, it is possible to capture an item of information indicative of the lay length of a line bundle anywhere on the line bundle.

The upgrade kit preferably includes a control device for controlling the at least one detecting device, whereby the at least one detecting device is controllable independently of the twisting device. With this, the upgrade kit can be used on an existing twisting device with its own simple control device. Typically, the control device of the at least one detecting device is connected to the control device of the existing twisting device so that the two devices can be controlled together.

Alternatively or additionally, the upgrade kit includes a control device for controlling a twisting device as described in this document.

The upgrade kit advantageously includes the evaluator as described in this document and the database described in this document, thereby enabling automatic an quality determination to be made of the lay length of a line bundle.

Further advantages, features and details of the invention will become apparent from the following description, in which exemplary embodiments of the invention are described with reference to the drawing.

The list of reference signs is a constituent part of the disclosure in the same way as the technical content of the patent claims and the drawing. The figures are described sequentially and with reference to the other figures. Identical reference signs denote identical components, reference signs with different indices indicate functionally equivalent or similar components.

Figure 2:
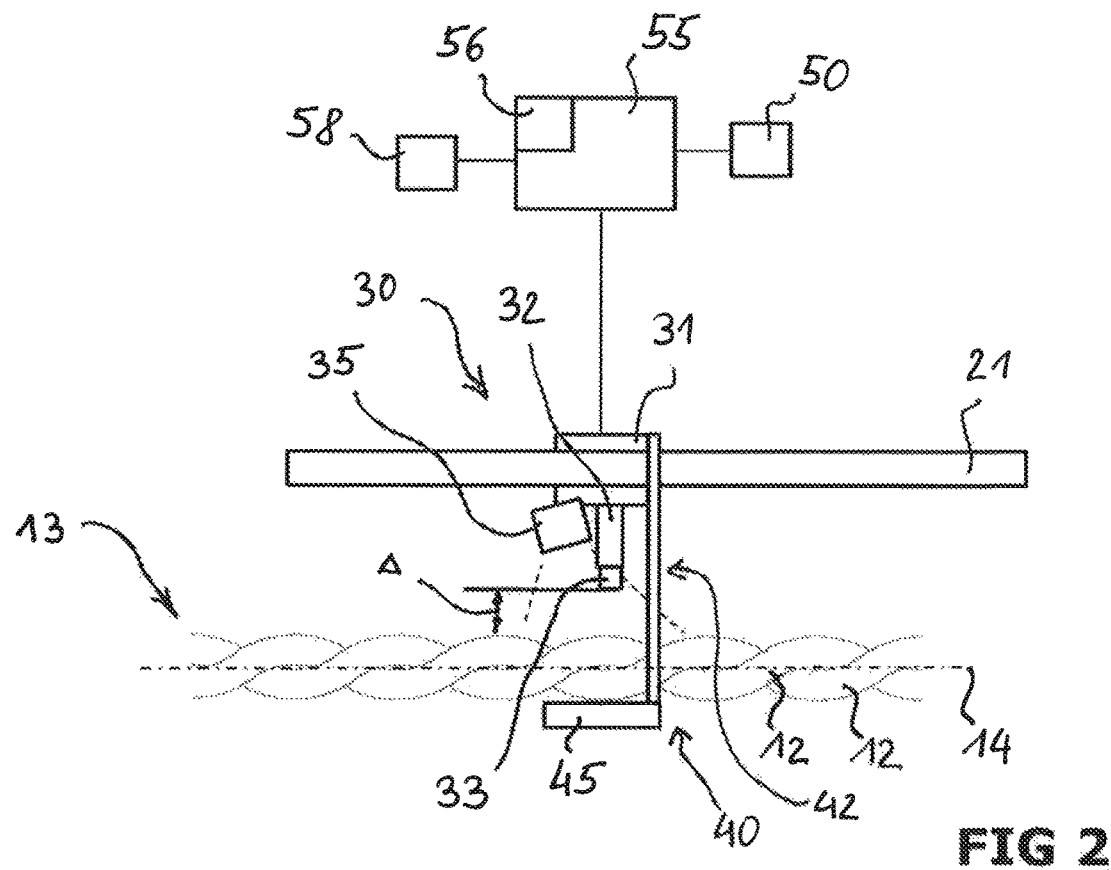
Figure 3:
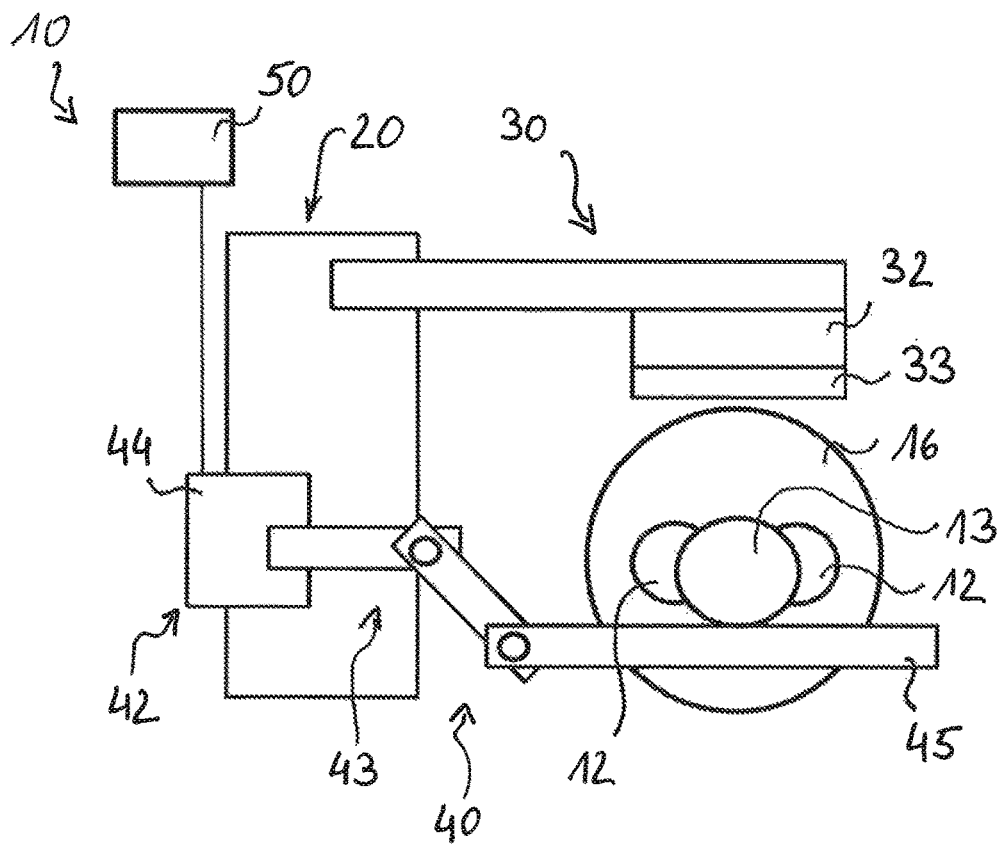
Figure 4:
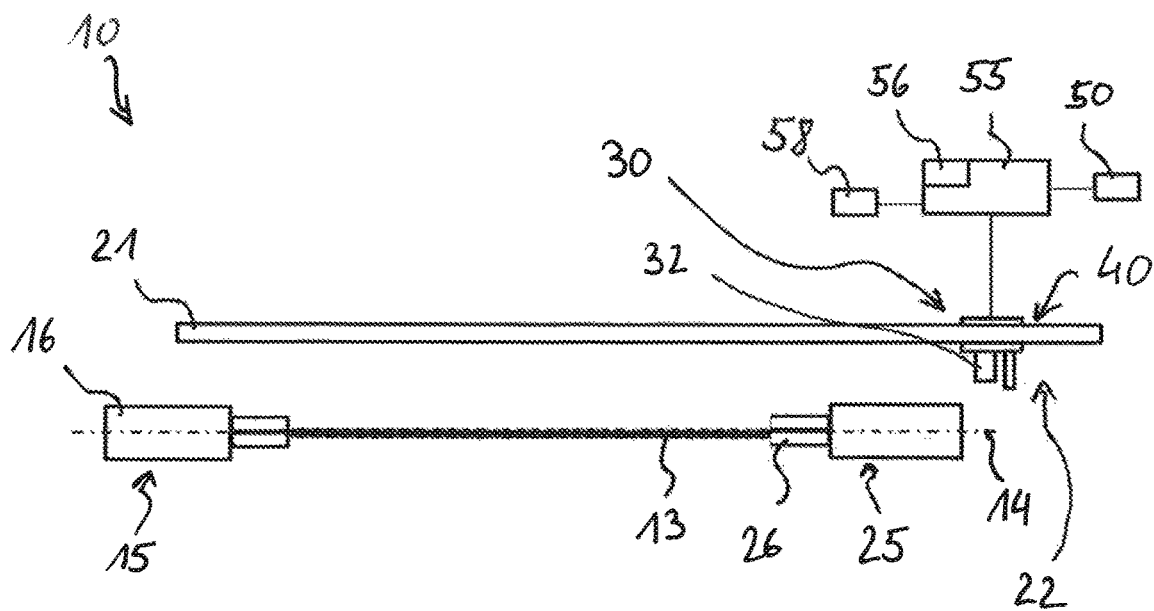
Figure 5:
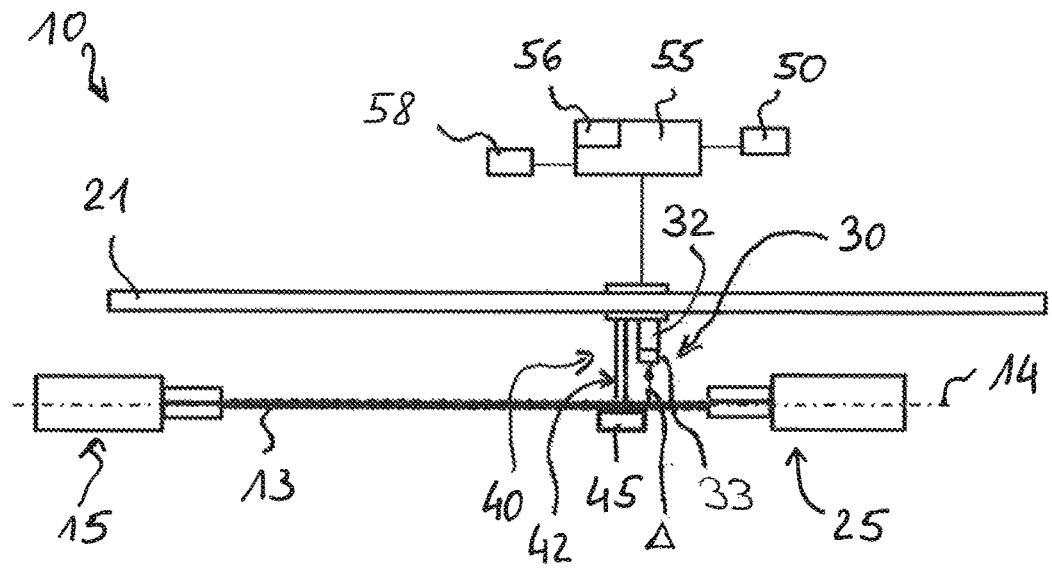
Figure 6:
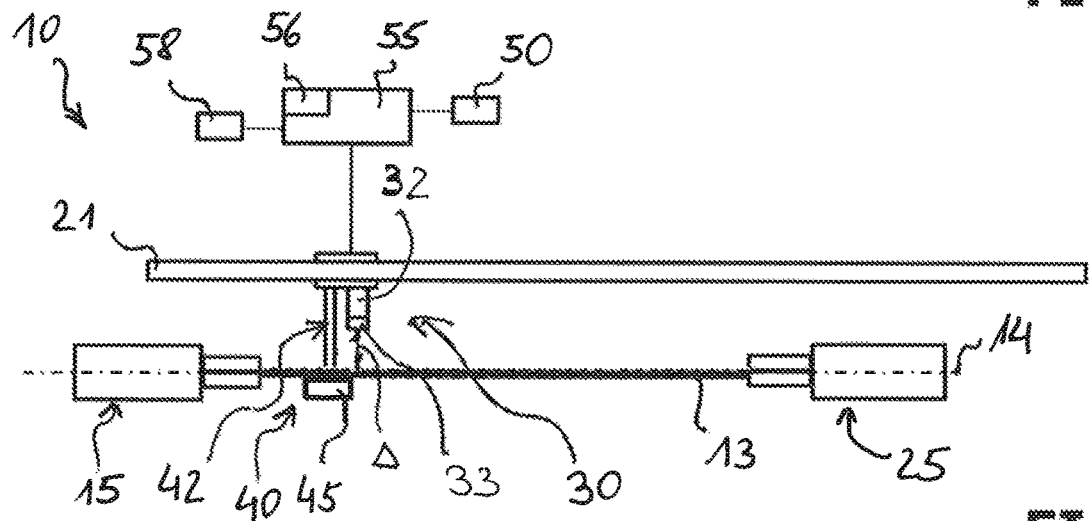
Figure 7:
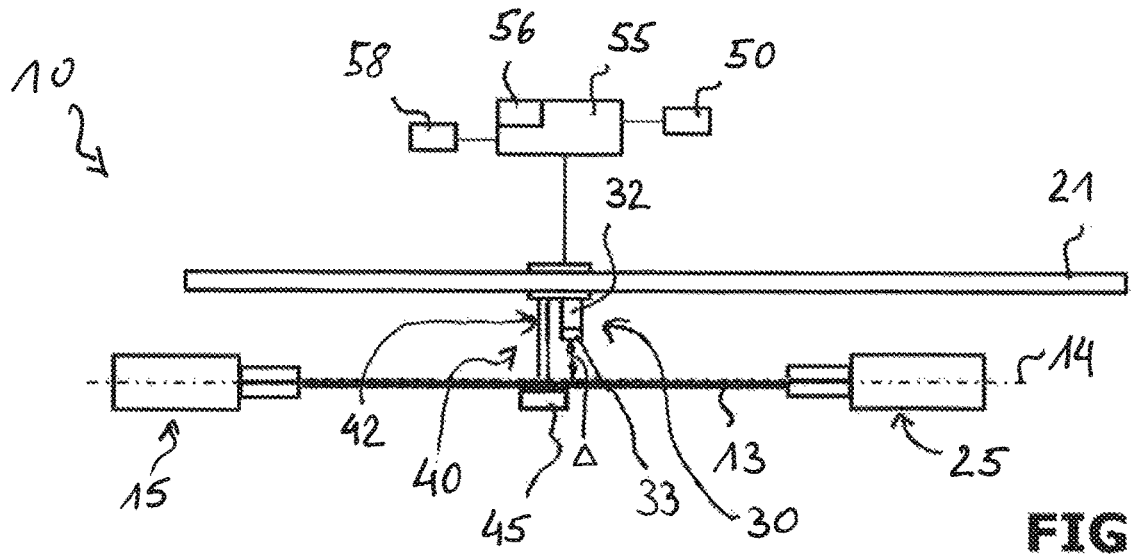
Figure 8:
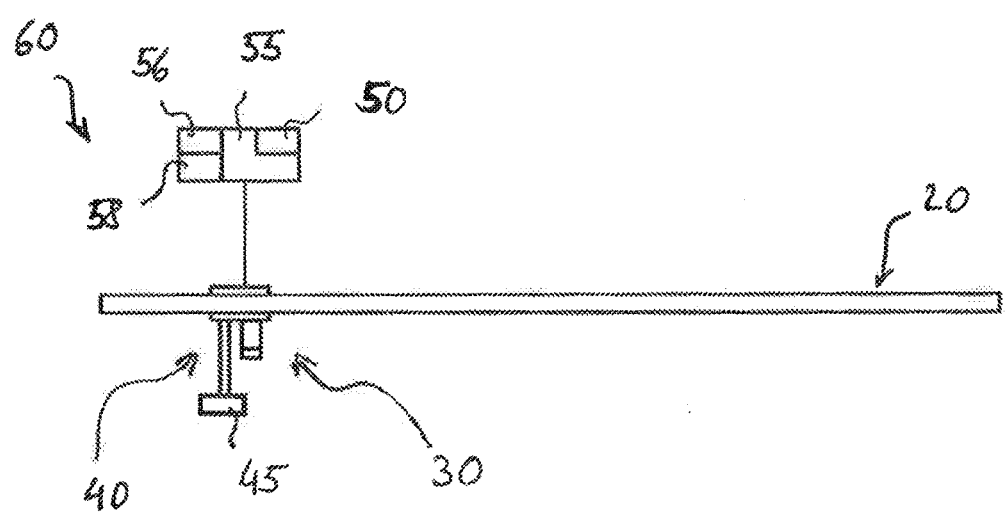

In the drawing:

FIG. 1 shows a side view of a first embodiment of a twisting device according to the invention, with a detecting device, FIG. 2 is a diagrammatic representation of detail X from FIG. 1, FIG. 3 is a diagrammatic detail view of the twisting device along line A-A in FIG. 1, FIG. 4 is a simplified illustration of the twisting device according to FIG. 1 with the detecting device in a resting position, FIG. 5 shows the illustration of FIG. 4 with the detecting device in a first position, FIG. 6 shows the illustration of FIG. 4 with the detecting device in a second position, FIG. 7 shows the illustration of FIG. 4 with the detecting device in a further position, and FIG. 8 shows a first embodiment of an upgrade kit according to the invention.

FIG. 1 shows a side view of a twisting device 10 for twisting or stranding electrical or optical lines 12 to form a line bundle 13 with a detecting device 30. The twisting device 10 comprises a first twisting head 15 and a clamping device 25, which are arranged spaced apart and opposite each other. The ends of the lines 12 that are to be twisted or stranded are clamped in the first twisting head 15 and the clamping device 25. The first twisting head 15 is equipped with a twisting rotor 16, and the clamping device 25 has a gripping device 26, and the respective ends of the lines 12 are clamped in them. The first twisting head 15 has a driving arrangement 17, for the present purposes a servomotor, for driving the twisting rotor 16 in rotating manner. The twisting device 10 includes a length compensation device 18 to compensate for the change in length of the lines 12 during the twisting process or stranding process. The length compensation device 18 is equipped with a displaceable length compensating slider 19, on which the first twisting head 15 is arranged. The twisting device 10 has a guide device 20 with a guide bar 21, on which a detecting device 30 and a support device 40 are mounted. The detecting device 30 has a driving arrangement 31, in the present case a servomotor, which causes the detecting device 30 to move along the guide bar 21, that is to say along the longitudinal axis 14 of the line bundle 13. The support device 40 is also arranged on the detecting device 30, so that the two can be moved together. The detecting device 30 and the support device 40 can be moved to any position between the first twisting head 15 and the clamping device 35. The guide device 20 extends farther in a region 22 outside of the first twisting head 15 and the clamping device 25, so that the detecting device 30 and the support device 40 can be positioned in this region 22.

The twisting device 10 is equipped with a control device 50 for controlling and regulating the movements of the twisting rotor 16 on the first twisting head 15. The control device 50 is connected to the driving arrangement 17 of the twisting rotor 16. The control device 50 is also connected electrically to the driving arrangement of the detecting device 30 for controlling and regulating the movements of the detecting device 30. The twisting device 10 includes an evaluator 55, which is connected electrically to the detecting device 30 and the control device 50 in order to exchange data. The evaluator 55 is also connected electrically to a database 58 for the purpose of exchanging data.

In an alternative variant of the twisting device 10 (not shown), the data can be exchanged between the control device 50, the evaluator 55, the detecting device 30 and the database 58 wirelessly, each of these devices being equipped with a transmitting unit and a receiving unit for data exchange.

In an alternative or further variant (not shown), the support device 40 has a separate driving arrangement, which means that the support device 40 the detecting device 30 are arranged so as to be movable on the guide device 20 independently of one another.

In an alternative or further variant of the twisting device 10 (not shown), the clamping device 25 is replaced with another twisting head with a twisting rotor and a driving arrangement. This enables the two twisting rotors to be driven in opposite directions, for example.

FIG. 2 shows a diagrammatic illustration of detail X from FIG. 1. The detecting device 30 and the support device 40 are arranged on the guide bar 21 and are movable in the direction of the longitudinal axis 14 of line bundle 13 (see FIG. 1) independently of the first twisting head 15 and the clamping device 35. The line bundle 13 consists of two lines 12, which are wound around each other or laid around each other by rotating about a common axis. The detecting device 30 and the support device 40 are electrically connected to the control device 50 of the twisting device 10. The control device 50 sends movement commands to the driving arrangement 31 of the detecting device 30 and of the support device 40 and controls and regulates the movements of the detecting device 30 and the support device 40 along the guide bar 21.

The detecting device comprises a camera 32 with an objective 33 and captures images of the line bundle 13. The objective 33 is used to adjust the focal length of the camera lens. A lighting device 35 is arranged on the detecting device 30 and illuminates the line bundle 13 at least in the region of the camera 32 while images of the line bundle 13 are captured. The camera 32 is electrically connected to the evaluator 55 for the purpose of exchanging data. The support device 40 includes a support unit 45 and a positioning unit 42. The line bundle 13 rests on the support unit 45. In this context, the distance Δ between the camera 32 and the line bundle 13 can be adjusted with the aid of the positioning unit 42 of the support device 40. The evaluator 55 comprises an arithmetic unit 56 which receives the data from the camera 32, for example the images of the line bundle 13 or the distance Δ from the line bundle 13 and processes them further. The arithmetic unit 56 comprises a computer and a memory unit (not shown). The evaluator 50 is electrically connected to a database 58 for the purpose of exchanging reference data and reference values. The database 58 contains a data library with stored data for various twisted or stranded line bundles 13 which have been created from test studies and/or saved in the data library by an operator. The evaluator 55 is electrically connected to the control device 50 for the purpose of exchanging data.

FIG. 3 shows a diagrammatic detail view of the twisting device 10 along line A-A in FIG. 1. The positioning unit 42 of the support unit 45 has a joint rod assembly 43 with a piston drive 44 for positioning the support unit 45 on the line bundle 13. In this way, the support unit 45 can be displaced or swivelled towards and away from the line bundle 13 with the aid of the joint rod assembly 43 and the piston drive 44. The support unit 45 supports the line bundle 13 clamped in the twisting rotor 16 in the close or swivelled in position on the side of the line bundle 13 opposite the objective 33 of the camera 32. In this case, the distance Δ between the camera 32 of the detecting device 30 and the line bundle 13 can be adjusted with the aid of the support unit 45 and the positioning unit 42. The support unit 45 is located apart from the line bundle 13 in a distant position (not shown) to avoid the line bundle coming into contact with the support unit 45.

The piston drive 44 is electrically connected to the control device 50. The control device 50 sends movement commands to the piston drive 44 of the positioning unit 42 and controls or regulates the movements or the support unit 45.

FIGS. 4 to 7 describe the method for determining or checking the lay length of a twisted or stranded line bundle 13 an a twisting device 10 as described in FIGS. 1 to 3, wherein said method is at least partially implemented in a computer program product that is stored in the arithmetic unit 56 of the evaluator 55 or in the control device 50 of the twisting device 10 and is executed automatically.

FIG. 4 shows a simplified representation of the twisting device 10 according to FIG. 1 with the detecting device 30 in a resting position. In a first step, the line bundle 13 is made available. For this, the respective ends of electrical and/or optical lines 12 are clamped into the twisting rotor 16 of the first twisting head 15 and the gripping device 26 of the clamping device 25, and twisted or stranded in a previously selected twisting or stranding process. Ideally, the twisted or stranded line bundle 13 has a defined lay length along its longitudinal axis 14 depending on the selected twisting or stranding process. The line bundle 13 in the twisting process is overwound to a certain degree and then wound back in the opposite direction of rotation with the result that a substantially twist-free line bundle 13 is produced. For this, the twisting process begins with a low rotating speed at the twisting rotor 16 until the lines 12 to be twisted lie flush against one another and the tensile force along the longitudinal axis 14 of the line bundle remains constant. Then, the rotating speed is increased. To terminate the twisting process, the rotating speed is slowed to a standstill.

The detecting device 30 and the support device 40 are arranged on the guide bar 21 and are located in a region 22, the resting position, outside of the clamping device 25 and the first twisting head 15 which are spaced apart from each other. The detecting device 30 is connected to an evaluator 55 and the arithmetic unit 56, the arithmetic unit being connected to the control device 50 and the database 58.

FIG. 5 shows the illustration of FIG. 4 with the detecting device 30 in a first position, wherein here the detecting device 30 is positioned with respect to the line bundle 13. The detecting device 30 and the support device 40 are moved along the guide bar 21 or along the longitudinal axis 14 of the line bundle 13 between the clamping device 25 and the twisting head 15. In this situation, the detecting device 30 and the support device 40 are moved to any first position relative to the line bundle 13, for the present purposes close to the clamping device 25. The support unit 45 of the support device 40 is moved or swivelled into the arbitrary first position of the line bundle 13 with the aid of the positioning unit 42, so that the support unit 45 supports the line bundle 13 and the line bundle 13 rests on the support unit 45 at a certain distance Δ from the camera 32.

If this has not already been done, the camera lens in the objective 33 of the camera 32 is then focused on the line bundle 13 so that the focal point of the camera lens can be placed on the line bundle 13.

In a further step, an image or series of images of the line bundle 13 is captured at this first position on the line bundle 13 with the aid of the camera 32 of the detecting device 30.

The captured image is then transmitted to the evaluator 55 for determining the lay length of the line bundle 13. In this process, the lighting device 35 (see FIG. 2) may be switched on as required.

The arithmetic unit 56 of the evaluator 55 receives the captured images and compares the images with reference data or a reference image which was transmitted in advance from the database 58 to the arithmetic unit 56 of the evaluator 40. For example, the images at the first position detected by the camera 32 are counted/evaluated in terms of their line bundle troughs and line bundle peaks and stored in the arithmetic unit 56. Optionally, the arithmetic unit 56 may generate an average value from the counted line bundle troughs and line bundle peaks of the captured images and/or for their respective distances from each other, and compare them with a reference value from the database 58. A lay length and/or a deviation from the required lay length is assigned to the line bundle 13 on the basis of this comparison. The lay length and/or the deviation in the lay length for this line bundle 13 is then stored in the database 58. If the lay length matches, it may be stored as a further statistical basis for the reference data. If the lay length is at variance, it may be used for statistical evaluation of errors or deviations in production for example. This step may be repeated for further segments or positions on line bundle 13. This is described in the following text with reference to FIGS. 6 and 7.

FIG. 6 shows the illustration of FIG. 4 with the detecting device 30 in a second position. The detecting device 30 and the support device 40 are moved along the guide bar 21 to a second position between the clamping device 25 and the twisting head 15, in this case close to the first twisting head 15, relative to the longitudinal axis 14 of the line bundle 13. The support unit 45 and the objective 33 of the camera 32 are guided at a defined distance Δ from the line bundle 13 with the aid of the control device 50 as described in this document. Then, an image or series of images of the line bundle 13 is captured at this second position with the aid of the camera 32. The image or series of images on the way to the second position on the line bundle 13 is transmitted to the evaluator 55 for determining the lay length of the line bundle 13 as described with reference to FIG. 5. The evaluator 55 is equipped with an arithmetic unit 56 and is connected to the database 58.

FIG. 7 shows the illustration of FIG. 4 with the detecting device 30 in a further position. In this context, the detecting device 30 and the support device are moved to a further position relative to the longitudinal axis 14 of the line bundle 13, wherein this further position lies on the line bundle 13 between the first and second positions on the line bundle 13, shown here as halfway between the clamping device 25 and the first twisting head 15. Alternatively, the further position on the line bundle may also be at a segment distance of a metre (1 m) from each of the previously mentioned positions on the line bundle (not shown). Then, the support unit 45 and the camera 32 are guided at a defined distance Δ from the line bundle 13, as described in this document. Then an image or series of images of the line bundle 13 is captured with the aid of the camera 32 at this further position, or the continuous capture of an image or series of images of the line bundle 13 is carried out over the travel path as far as this further position. The image or series of images of the further position or r the travel path as far as this further position on the line bundle 13 is transmitted to the evaluator 55 for determining the lay length of the line bundle 13, as described with reference to FIG. 5.

The arithmetic unit 56 of the evaluator 55 may also compare the images captured at the first, second and further positions with reference data or a reference image. This is transmitted to the arithmetic unit 56 of the evaluator 40 from the database 58 in advance.

Optionally, the arithmetic unit 56 generates an average value from the captured images of the first, second and further positions and compares them with a reference image from the database 58. A comparison of the images with reference data, for example reference images, is carried out in the arithmetic unit 56. Alternatively, data extracted from the images such as the number or distance between line bundle troughs may be compared with corresponding reference values. In this way, an averaged lay length can be assigned to the entire line bundle 13. The lay length of this line bundle 13 is then saved in the database 58. The dimensional tolerances of the derived lay lengths may also be calculated and stored.

If a deviation between the lay length for the line bundle 13 outside a previously defined tolerance is not detected during the comparison as described here, a lay length is assigned to the line bundle.

If a deviation between the lay length for the line bundle 13 outside a previously defined tolerance is detected during the comparison as described here, the arithmetic unit 56 of the evaluator 55 generates correction data and/or a correction value and stores it in the evaluator 55.

Then, the support unit 45 is moved or swivelled away from the line bundle 13 by means of the joint rod assembly 43 and with the piston drive 44, and the line bundle 13 is released from the twisting device 10. However, it is also possible that in the event of a deviating lay length, i.e. if the quality requirement is not satisfied, the operator of the twisting device must acknowledge the release of the line bundle or release it manually himself, with the result that it is removed separately from the production chain.

The correction data and correction value are taken into account in the arithmetic unit 56 for the purpose of generating new datasets and movement commands. The datasets and movement commands generated thereby are transmitted to the control device 50 for controlling the movements of the twisting device 10 and/or to the control device 50 for controlling the movements of the detecting device 30. In this way, the twisting process or the stranding process of the lines 12 and/or the determined lay length of the line bundle 13 are corrected. For example, the rotating speed of the twisting rotor 16 of the first twisting head 15 is modified so that in a subsequent twisting process or stranding process the desired, uniform lay length with the desired tolerance is produced on the line bundle 13.

FIG. 8 shows an upgrade kit 60 usable for any twisting device. The upgrade kit includes the detecting device 30 for capturing an image of the line bundle and a computer program product. The upgrade kit 60 also includes the support device 40. The upgrade kit 60 includes the guide device 20 which can be mounted on a twisting device, while the detecting device 30 and the support device 40 are disposed movably on the guide device 20. The upgrade kit 60 further includes the evaluator 55 with the arithmetic unit 56 and the database 58, and the control device 50 for controlling or regulating the detecting device 30 and the support device 40. The control device 50 is electrically connected to the control device of a twisting device for the purpose of exchanging movement commands and/or datasets. The components of the upgrade kits and their functions were described earlier with reference to FIGS. 1 to 7.

REFERENCE LIST

10 Twisting device
12 Lines
13 Line bundle
14 Longitudinal axis of 13
15 First twisting head
16 Twisting rotor of 15
17 Driving arrangement of 16
18 Length compensation device
19 Length compensating slider
20 Guide device
21 Guide bar
21 Region
25 Clamping device
26 Gripping device
30 Detecting device
31 Driving arrangement of 30
32 Camera
33 Objective of 32
35 Lighting device
40 Support device
42 Positioning unit
43 Joint rod assembly
44 Piston drive
45 Support unit
50 Control device
55 Evaluator
56 Arithmetic unit
58 Database
60 Upgrade kit

The invention claimed is:

1. A twisting device (10) for twisting or stranding electrical or optical lines (12) to form a line bundle (13), the twisting device (10) comprising:
 at least a first twisting head (15), and
 a clamping device (25),
 wherein the first twisting head (15) and the clamping device (25) are spaced apart opposite from each other, for, in operation, clamping respective ends of the lines (12), and
 at least one detecting device (30) for capturing an item of information indicative of a lay length of the line bundle (13), and
 at least one support device (40) for supporting the lines (12);
 wherein the at least one detecting device (30) and the at least one support device (40) are movable relative to the first twisting head (15) and the clamping device (25) along a longitudinal axis of the clamped lines (12), respectively line bundle (13), wherein the at least one support device (40) is arranged on the guide device (20) and is movable relative to the first twisting head (15) together with the detecting device (30) during twisting or stranding of the lines (12).

2. The twisting device (10) according to claim 1, wherein the twisting device (10) includes a guide device (20), and the at least one detecting device (30) is arranged on the guide device (20).

3. The twisting device (10) according to claim 1, wherein the support device (40) has a support unit (45) having a shape chosen from the group consisting of cylindrical shape, T-shape, and V-shape.

4. The twisting device (10) according to claim 1, wherein the at least one detecting device (30) comprises a camera (32) or a laser sensor for capturing the indicative information of the lay length of the line bundle (13).

5. The twisting device (10) according to claim 4, wherein the twisting device (10) is equipped with a lighting device (35) and the lighting device (35) is arranged on the at least one detecting device (30) and is an integral component of the camera (32).

6. The twisting device (10) according to claim 1, wherein the twisting device (10) is equipped with a control device (50) for controlling or regulating the twisting device (10) and/or an evaluator (55) for evaluating the indicative information of the lay length of the line bundle (13), and the at least one detecting device (30) is connected to the evaluator (55) for exchanging data, and the evaluator (55) is connected to the control device (50).

7. The twisting device (10) according to claim 6, wherein the evaluator (55) is connected to at least one database (58) for providing reference data.

8. The twisting device (10) according to claim 1, wherein a length compensation device (18) is provided to compensate for a change in length of the lines (12) during a twisting process or stranding process, which device includes a displaceable length compensating slider (19).

9. A method for determining or checking a lay length of a twisted or stranded line bundle (13) on a twisting device (10) according to claim 1, wherein the method comprises the following steps:
making the line bundle (13) available;
positioning at least one detecting device (30) for the line bundle (13) at a certain distance from the line bundle (13),
wherein the at least one detecting device (30) is moved to any first position relative to the line bundle (13), along a longitudinal axis (14) of the line bundle (13); and
capturing the item of information indicative of the lay length of the line bundle (13), at the first position on the line bundle (13) with the aid of the at least one detecting device (30), and
supporting at least a section of the line bundle (13) by means of at least one support device (40) in the region of the at least one detecting device (30) before the at least one item of information indicative of the lay length of the line bundle (13) is captured,
wherein the moving of the at least one detecting device (30) and the at least one support device (40) along the longitudinal axis (14) of the line bundle (13) between a first twisting head (15) and a clamping device (25) of the twisting device is independent from each other.

10. The method according to claim 9, wherein the at least one item of information indicative of the lay length of the line bundle (13) is transmitted to an evaluator (55) for evaluating the lay length of the line bundle (13).

11. The method according to claim 10, wherein the at least one detecting device (30) is moved to a further position relative to the line bundle (13) and captures one item of information indicative of the lay length of the line bundle (13) at the further position on the line bundle (13), and captures at least one item of information indicative of the lay length of the line bundle (13) on a travel path to the further position and transmits the one item of information indicative of the lay length of the line bundle (13) at the further position on the line bundle (13) to the evaluator (55).

12. The method according to claim 10, wherein the evaluator (55) compares the at least one item of information indicative of the lay length of the line bundle (13) from the first and/or further position with reference data and assigns a first and/or a further lay length to the line bundle (13) at the respective position.

13. The method according to claim 12, wherein the first and/or further assigned lay length is stored in at least one database (58).

14. A method for determining or checking a lay length of a twisted or stranded line bundle (13) on a twisting device (10) for twisting or stranding electrical or optical lines (12) to form a line bundle (13), the twisting device (10) having
at least a first twisting head (15), and
a clamping device (25),
wherein the first twisting head (15) and the clamping device (25) are spaced apart opposite from each other, for, in operation, clamping respective ends of the lines (12), and
at least one detecting device (30) for capturing an item of information indicative of a lay length of the line bundle (13), and
at least one support device (40) for supporting the lines (12);
wherein the at least one detecting device (30) and the at least one support device (40) are independently movable relative to the first twisting head (15) and the clamping device (25) along a longitudinal axis of the clamped lines (12), respectively line bundle (13), the method comprises the following steps:
making the line bundle (13) available;
positioning at least one detecting device (30) for the line bundle (13) at a certain distance from the line bundle (13),
wherein the at least one detecting device (30) is moved to any first position relative to the line bundle (13), along a longitudinal axis (14) of the line bundle (13); and
capturing the item of information indicative of the lay length of the line bundle (13), at the first position on the line bundle (13) with the aid of the at least one detecting device (30), and
supporting at least a section of the line bundle (13) by means of at least one support device (40) in the region of the at least one detecting device (30) before the at least one item of information indicative of the lay length of the line bundle (13) is captured,
wherein the moving of the at least one detecting device (30) and the at least one support device (40) along the longitudinal axis (14) of the line bundle (13) between a first twisting head (15) and a clamping device (25) of the twisting device is independent from each other,
wherein the at least one support device (40) is moved relative to the line bundle (13), and the at least one support device (40) is moved together with the at least one detecting device (30), and the at least one support device (40) and the at least one detecting device (30) are moved while the lines (12) are being twisted or stranded.

* * * * *